United States Patent [19]

Brown

[11] Patent Number: 4,721,947
[45] Date of Patent: Jan. 26, 1988

[54] WELDING MONITOR

[75] Inventor: Kenneth W. Brown, Cambridge, England

[73] Assignee: The Welding Institute, Cambridge, England

[21] Appl. No.: 839,874

[22] Filed: Mar. 14, 1986

[30] Foreign Application Priority Data

Mar. 19, 1985 [GB] United Kingdom ............... 8507094

[51] Int. Cl.$^4$ ............................................. B23Q 17/00
[52] U.S. Cl. ................................. 340/540; 228/103; 228/56.5; 340/679
[58] Field of Search ............... 340/540, 679; 228/102, 228/103, 56.5

[56] References Cited

U.S. PATENT DOCUMENTS

| | | | |
|---|---|---|---|
| 4,001,540 | 1/1977 | Drake et al. | 219/110 |
| 4,024,371 | 5/1977 | Drake | 219/110 |
| 4,067,490 | 1/1978 | Jones et al. | 228/102 |
| 4,359,622 | 11/1982 | Dostoomian et al. | 219/110 |
| 4,419,560 | 12/1983 | Zurek | 219/117.1 |
| 4,447,698 | 5/1984 | Van Sikle et al. | 219/110 |
| 4,518,844 | 5/1985 | Needham | 219/137 |
| 4,606,490 | 8/1986 | Chan et al. | 228/103 |

FOREIGN PATENT DOCUMENTS

| | | | |
|---|---|---|---|
| 0099795 | 2/1984 | European Pat. Off. | |
| 2837284 | 3/1979 | Fed. Rep. of Germany | 228/102 |
| 128340 | 7/1985 | Japan | 228/103 |
| 83/02005 | 6/1983 | PCT Int'l Appl. | |
| 1577823 | 10/1980 | United Kingdom | |
| 2094988 | 3/1981 | United Kingdom | |
| 2123156 | 1/1984 | United Kingdom | |

Primary Examiner—Stewart J. Levy
Assistant Examiner—Joseph W. Roskos
Attorney, Agent, or Firm—Martin M. Novack

[57] ABSTRACT

A welding monitor for use with a welding system is described. The monitor comprises a store (74) for storing at least two sets of predetermined acceptable ranges for one or more welding parameters such as voltage and current. A comparator bank (66,67) is provided for each parameter to compare the operating value of each parameter in use with the corresponding stored range or ranges. A display including sets of light emitting diodes (18-20) displays information relating to the stored ranges and operating values and is responsive to the comparator banks (66,67) to indicate the relationship between an operating value of at least one of the parameters and the corresponding predetermined range.

30 Claims, 15 Drawing Figures

Fig. 8.

| PROGRAMME NO. | VOLTAGE PARAMETERS | | | | | | CURRENT PARAMETERS | | | | | |
|---|---|---|---|---|---|---|---|---|---|---|---|---|
| | LOW | | PREFERRED VALUE | HIGH | | | LOW | | PREFERRED VALUE | HIGH | | |
| | TOLERANCE LEVELS 'ALARM' | 'WARNING' | | 'WARNING' | 'ALARM' | | TOLERANCE LEVELS 'ALARM' | 'WARNING' | | 'WARNING' | 'ALARM' | |
| 1 | 25.5 | 26.0 | 27.0 | 28.0 | 29.0 | | 250 | 260 | 270 | 280 | 290 | |
| 2 | 27.5 | 28.0 | 29.0 | 30.0 | 31.0 | | 280 | 290 | 300 | 310 | 320 | |
| 3 | 29.5 | 30.0 | 31.0 | 32.0 | 33.0 | | 310 | 320 | 330 | 340 | 350 | |
| 4 | 22.0 | 23.0 | 24.0 | 25.0 | 26.0 | | 180 | 190 | 200 | 210 | 220 | |
| 5 | 20.0 | 21.0 | 22.0 | 23.0 | 24.0 | | 160 | 170 | 180 | 190 | 200 | |
| 6 | 17.0 | 18.0 | 19.0 | 21.0 | 22.0 | | 138 | 142 | 150 | 166 | 174 | |
| 7 | 17.8 | 18.3 | 19.0 | 20.3 | 20.8 | | 140 | 145 | 150 | 160 | 164 | |
| 8 | 18.3 | 18.7 | 19.0 | 19.7 | 20.2 | | 143 | 147 | 150 | 155 | 159 | |
| LED LIT | 22 | 23 | 24 | 25 | 26 | | | | | | | |

*Fig. 10.* a
```
P-21    18·0   19·5  21·5
VOLTS    LO     OK    HI
``` b
```
P-21    18·0   19·5  21·5
VOLTS   ****   19·9  ****
``` c
```
P-67    143     OK    168
AMPS     LO    153    HI
``` d
```
P-67    143 ·*···· 168
AMPS    [LO]   149   [HI]
```

*Fig. 11.* a
```
P-21    18·0          21·5
VOLTS         18·3
``` b
```
P-21    18·0          21·5
VOLTS         19·9
``` c
```
P-67    143           168
AMPS          145
``` d
```
P-67    143           168
AMPS          156
```

WELDING MONITOR

There is an increasing need for quality assurance in welding. This quality assurance varies from maintaining the very highest standards of welding in for example nuclear constructions to ensuring that just-adequate welds are made for low-cost fabrications. In the past, the quality of a weld has depended upon the skill of the welding operator and in general the welder requires a high degree of skill in view of the wide variety of welding parameters which must be controlled and which vary depending upon the welding conditions. These parameters include the welding current and welding voltage which for each welding operation should be set and maintained at preferred levels.

Semi-automatic, mechanised, automatic or robotic welding systems have been developed in an attempt to deal with the variety of welds required. For example, welding systems controlled by microprocessors which are preprogrammed for a plurality of welding operations have been developed. This means in principle that the programs define the welding parameters. Although such systems are generally satisfactory, it has been found that due to changes in welding conditions the welding parameters can change from their pre-progammed values. For quality assurance purposes therefore it is essential that these parameter levels are monitored throughout the welding operation to ensure that deviations outside allowable tolerances do not go unnoticed. To deal with this, it is necessary for a welder to view displays of operating values of the or each parameter and to modify the parameters if necessary. This is clearly undesirable since it relies upon the welder being able to monitor one or more parameters simultaneously and to remember the tolerance limits for each parameter.

In accordance with one aspect of the present invention, we provide a welding monitor for use with a welding system, the monitor comprising storage means for storing at least two sets of predetermined acceptable ranges for one or more welding parameters; comparison means for comparing an operating value of the or each parameter in use, determined by sensing means to which the monitor is connected, with the corresponding range or ranges; and display means for displaying information relating to the stored ranges and operating values and responsive to the comparison means for indicating the relationship between an operating value of at least one of the parameters and the corresponding predetermined range.

In accordance with a second aspect of the present invention, a method of monitoring a welding system comprises monitoring at least two welding parameters; comparing the monitored parameters with respective predetermined ranges; and displaying the relationship between the monitored parameters and the respective ranges.

In accordance with a third aspect of the present invention, a method of monitoring a welding system comprises monitoring at least one welding parameter; comparing the monitored parameter with at least two predetermined ranges; and displaying the relationship between the monitored parameter and ranges.

Our invention removes the need for personnel continually to watch the operating or real time values of the or each parameter by automatically providing a display of the relationship of the operating value with the corresponding range.

In its simplest form, the predetermined acceptable ranges may relate to the same welding parameter and the same welding operation and provide just two sets of ranges or tolerance zones about the same preferred value to comply with different quality assurance standards. This could also be used as a teaching aid. In another example, the two sets of predetermined acceptable ranges may relate to two different welding parameters, such as voltage and current, for the same welding operation.

It is particularly convenient, however, if the sets of predetermined acceptable ranges relate to different welding operations. This arrangement is particularly useful in the cases of semi-automatic, mechanised, automatic, or robotic welding sytems based on preprogrammed operation. In the past, a welder has had to memorise or look up the appropriate ranges so that he knows what values of the parameter are acceptable at any particular moment. Preferably, therefore, the monitor further comprises selector means responsive to the welding programme selected in use to apply a corresponding set of ranges from the storage means to the comparison means.

This enables the monitor automatically to carry out comparisons with the correct ranges without operator intervention.

The parameters monitored may include welding current, welding voltage, wire feed speed, welding power, and a ratio M defined as the ratio of the means of the arc duration to the means of the short-circuit duration in a short-circuit MIG welding system. This latter parameter is described in more detail in our U.S. Pat. No. 4,518,844. Other parameters may be used such as travel speed, and heat input, depending upon the type of welding involved.

The values stored by the storage means defining the predetermined acceptable ranges may take a variety of forms. Conveniently, the values comprise upper and lower limits. Alternatively, the values may comprise preferred values, the comparison means determining the upper and lower limits as predetermined percentages of the preferred values. These percentages may also be stored for each parameter or set of ranges or may be the same for all parameters.

The predetermined range or percentage may be made small so that the upper and lower limits are close to the preferred operating value. This is particularly convenient when setting up the welding system for a known operation for which the preferred values have been previously established for example by experience or trial and error. The monitor then indicates whether the real time values are higher or lower than desired so that appropriate adjustment may be made to the welding system without the necessity for reading numerical values on indicating meters and the like. With narrow operating limits (close tolerances) then the welding system is more precisely set up to the desired conditions. Thereafter the approved wider range is utilised in monitoring the welding operation as described.

The display means may comprise a common numeric and/or alpha numeric display, and a selector to enable one or more of preferred values, limits of ranges and operating values of a selected parameter to be displayed. Thus, the selector may be adjusted to select which parameter is to be displayed and which value relating to that parameter is displayed. For example, the selector may cause the operating real-time value of the selected parameter to be displayed or an upper or lower limit defining the acceptable range of that parameter to be displayed.

Alternatively, the display means may be adapted to display both the real-time value and the upper and lower limits of the range (and the preferred value if desired).

The display means may comprise in addition to or alternatively to an alpha-numeric display at least one array of differently coloured display units which are successively illuminated as the operating value of a parameter varies relatively to the corresponding predetermined range. This simplifies the information presented by the monitor to the welding operator since he can determine visually and quickly if the operating value of the parameter is acceptable. The degree of detail in such a display can range from a simple 3 lamp two colour (red=unacceptably low, green=acceptable, red=unacceptably high) display to a multi-colour display. This latter arrangement provides an indication of when a parameter is approaching the end limits of the permissible range.

In another example, the display means may comprise a plurality of sets of three display areas, one set for each parameter, the display areas of each set indicating the upper and lower values of the range together with the operating value of the parameter.

The display means may also be adapted to indicate the presence or absence of a characteristic such as water or gas flow during the welding operation.

Preferably, the display means includes an alarm condition detector connected to the comparison means to determine when a parameter is unacceptable and to generate an alarm signal. The alarm signal may be generated simply when a parameter falls outside its predetermined range, the alarm signal causing a visual and/or an audible alarm such as a siren to be activated and/or causing a visible mark to be formed on the workpiece. For example, red paint could be sprayed onto the workpiece. Alternatively or additionally the alarm signal could cause the welding operation to be terminated.

In general, an operating value of a parameter may be unacceptable in one of two ways. There could be a short duration excursion of relatively large extent or alternatively a long duration excursion of a relatively small extent. The first of these may in some cases be tolerable so that preferably, the alarm condition detector is adapted to determine that a parameter is unacceptable when the parameter lies outside the corresponding predetermined range for a continuous predetermined duration. The predetermined duration may be for example 5 seconds.

In a more sophisticated arrangement, the alarm condition detector is adapted to monitor the operating values of the parameters at regular intervals and, at each interval, to increment a running total by an amount corresponding to the position of the operating value relatively to the corresponding predetermined range to generate a weighted error total and to generate an alarm signal when the weighted error total exceeds a predetermined value.

Conveniently, the monitor includes a key operated switch for enabling the welding system to which it is connected so as to prevent further use of the welding system with unacceptable parameter deviations.

The display means may also include a printer which provides a printed record of the monitored parameters with respect to time particularly when out-of-tolerance levels are indicated.

The storage means may be provided by, for example, a bank of presettable resistors, a plug-in card containing a network of resistors of predetermined value or by an EPROM and may include storage setting means, for example a microprocessor, actuable when the monitor is in a set-up (or learn) mode to store the appropriate ranges. Conveniently, the ranges are defined by upper and lower limits.

The appropriate high/low limit values may be entered externally by any convenient means such as for example via a computer terminal, dedicated key pad or alphanumeric keyboard. Alternatively the limits may be expressed as deviations about the preferred value. In one particularly convenient arrangement the preferred value of the or each parameter can be established using the monitor to register the real time operating values for a weld which is adjudged by suitable techniques as satisfactory. This may correspond to the average value of the parameter over a predetermined duration eg. 10 secs. Deviation limits are then assigned to the or each preferred value so determined and the monitor used subsequently for similar welds. One advantage of this self-learning approach is that the preferred values suit the actual welding system and welder concerned. A different welder or welding system may well involve significantly different preferred values even for the same weld and for nominally the same equipment.

Yet again the monitor can be arranged with the limits set very high and very low, and during welding progressively to reduce the range by adjusting for example the preset resistors until only a small difference remains about the preferred operating value. This can then be extended a finite amount either side of the preferred value by for example turning preset resistors to a known degree. The monitor is then ready for use as previously described but without having to register numerical values or enter high/low limits numerically. Alternatively having found the preferred value by experiment, its numerical value can be determined and the high/low limits also set numerically according to the requirements.

Control of the monitor mode (learn or operating) may be manually achieved but conveniently the monitor further comprises a condition selector actuable to pass to the display means an operating value of a parameter when the monitor is in an operating mode or a stored value when the monitor is in a learn (set-up or programming) mode. Conveniently, the condition selector comprises a welding detector which determines whether the monitor should be in the operating mode or the learn mode in accordance with whether or not a welding operation is detected.

Some examples of welding monitors in accordance with the present invention in association with a welding system will now be described with reference to the accompanying drawings, in which:

FIG. 8 shows in tabulated form the values of a suite for eight typical MIG welding programmes;

FIG. 10 illustrates four examples of the information given by the alpha-numeric display in FIG. 9;

FIG. 11 is similar to FIG. 10 and illustrates a further four examples;

Figure 1:
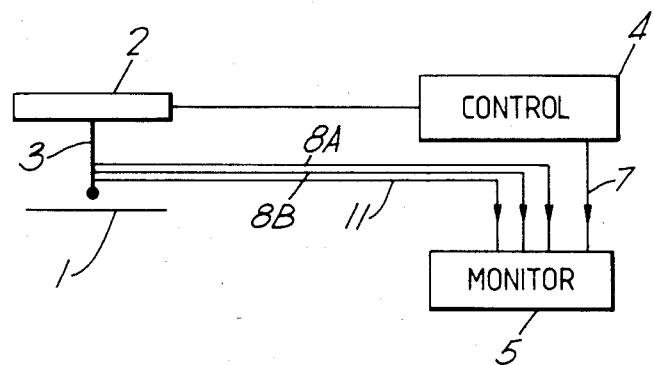
FIG. 1 is a schematic diagram of the welding system.

FIG. 1 is intended to illustrate schematically a welding system for carrying out any known method of arc welding, for example gas-shielded arc welding. The system comprises a workpiece 1 and welding head support 2 which may be formed by a robot arm from which an electrode wire 3 extends from a store (not shown). Welding control apparatus 4 includes a microprocessor (not shown) which controls the operating parameters of the welding system such as welding current and voltage. The microprocessor is responsive to the relative positions of the electrode wire 3 and workpiece 1 to determine which programme out of for example sixty or more is appropriate. The operation of the welding process is monitored by a monitor 5 to be described in detail below.

Figure 2A:
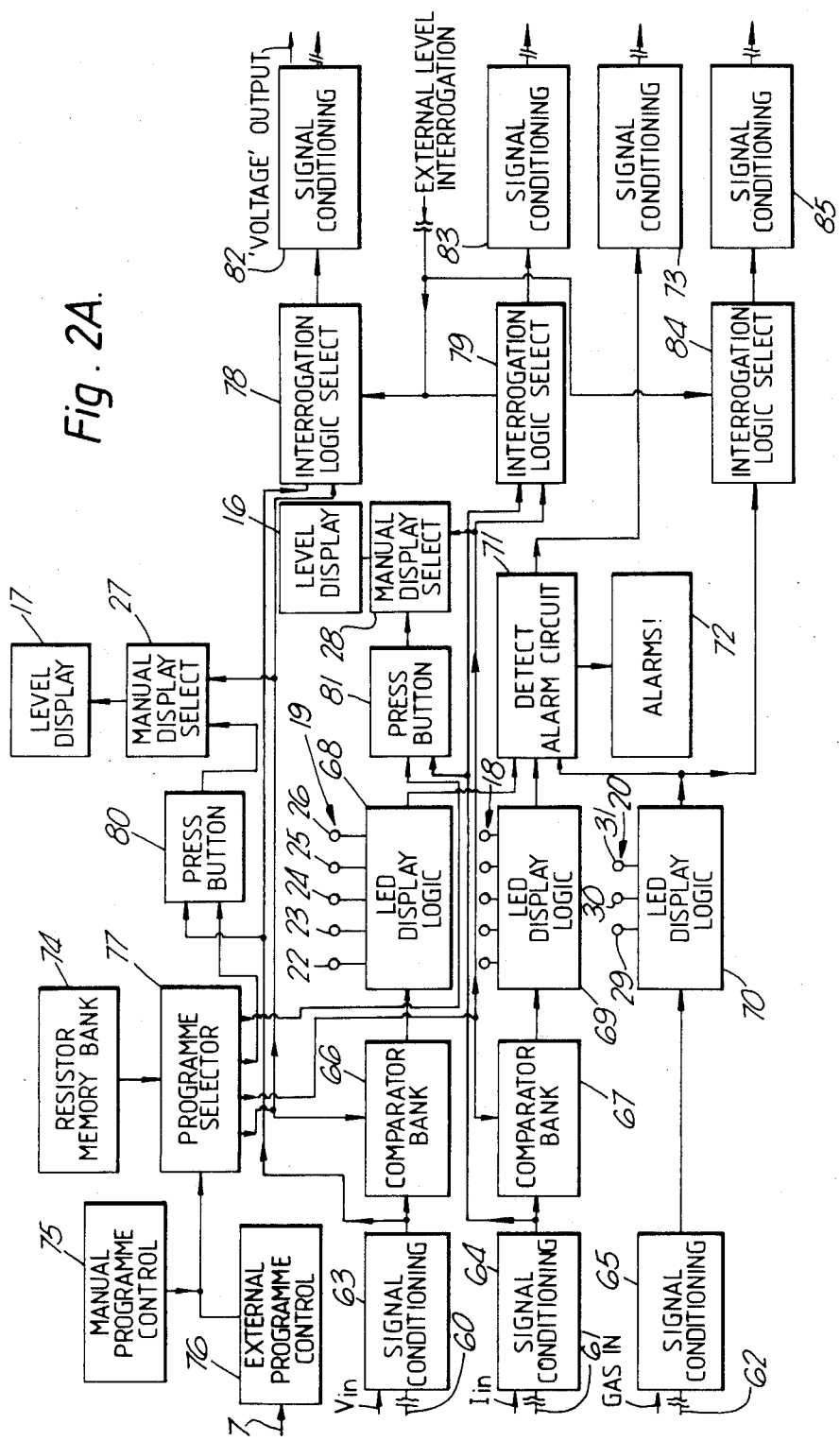
FIGS. 2A and 2B are schematic block diagrams of first and second examples of a monitor.

FIG. 2A illustrates in block diagram form the construction of a first example of the monitor 5, all the components shown in FIG. 2A being contained in a tamperproof box.

Figure 3:
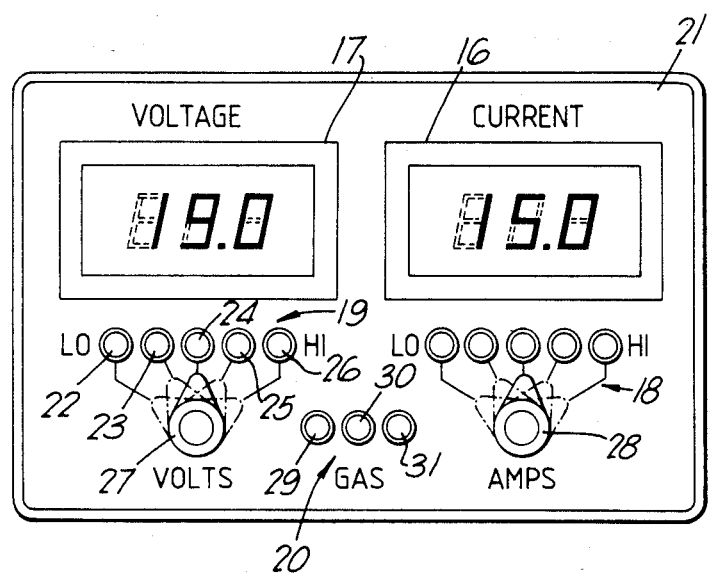
FIGS. 3 to 7 illustrate the front panel display of the monitor of FIG. 2 at different stages.

The monitor 5 includes voltage, current and gas input ports 60–62 connected to respective signal conditioning circuits 63–65. The ports 60–62 are connected to the lines 8A, 8B, 11 which carry analogue signals representing the voltage, current and gas flow respectively. These signals are conditioned by the circuits 63–65 for subsequent processing. The signal conditioning circuits 63, 64 are connected to respective comparator banks 66, 67 and to manual display selectors 27, 28. The manual display selectors 27, 28 control respective alphanumeric displays 17, 16. The comparator banks 66, 67 provide output signals to respective LED display logic circuits 68, 69 each of which controls a line of five coloured light emitting diodes (LEDs) 22–26 visible in a front panel 21 of the monitor (FIG. 3). The lines of LEDs define displays 18, 19. Alternatively, lamps could be positioned behind coloured filters.

The signal conditioning circuit 65 is connected directly to an LED display logic circuit 70 controlling a set of three coloured LEDs 29–31 defining a display 20.

The outputs from the display logic circuits 68–70 are fed to a detect alarm circuit 71 which determines when an alarm condition exists to control an audible alarm 72 and which feeds an output signal to a signal conditioning circuit 73 whose output constitutes an "alarm present" signal.

The monitor includes an array 74 of presettable resistors. In this example, for each parameter (voltage and current) there is provided eight sets of five resistors. Each set of five resistors corresponds to a particular welding programme with one of the five resistors representing a preferred value for the parameter and the other resistors defining tolerance levels to be explained below. The resistors are preset manually. It should be understood that by "preferred" is meant the value which is considered to produce an acceptable weld. This may differ depending on the operator and other factors.

The array 74 is connected to a programme select logic circuit 77 having outputs connected to the comparator banks 66, 67 and to the manual display selectors 27, 28 and interrogation logic select circuits 78, 79.

Press buttons 80, 81 are positioned at the back of the monitor to control whether an operating value of a parameter or its preferred value is displayed by the displays 16, 17 as will be explained below.

The interrogation logic select circuits 78, 79 are responsive to an external level interrogation signal to generate an output signal via signal conditioning circuits 82, 83, representing either the operating value of the respective parameter of one of the stored values.

An interrogation logic select circuit 84 is connected to the output from the circuit 70 to provide via a signal conditioning circuit 85 an output signal representing gas flow. The circuit 84 is controlled by the external level interrogation signal to generate an output signal representing the operating value of gas flow.

The output signals may for example have frequencies related to the value of the parameters and be fed to a remote computer or the like or be used to control a printer.

Figure 2B:
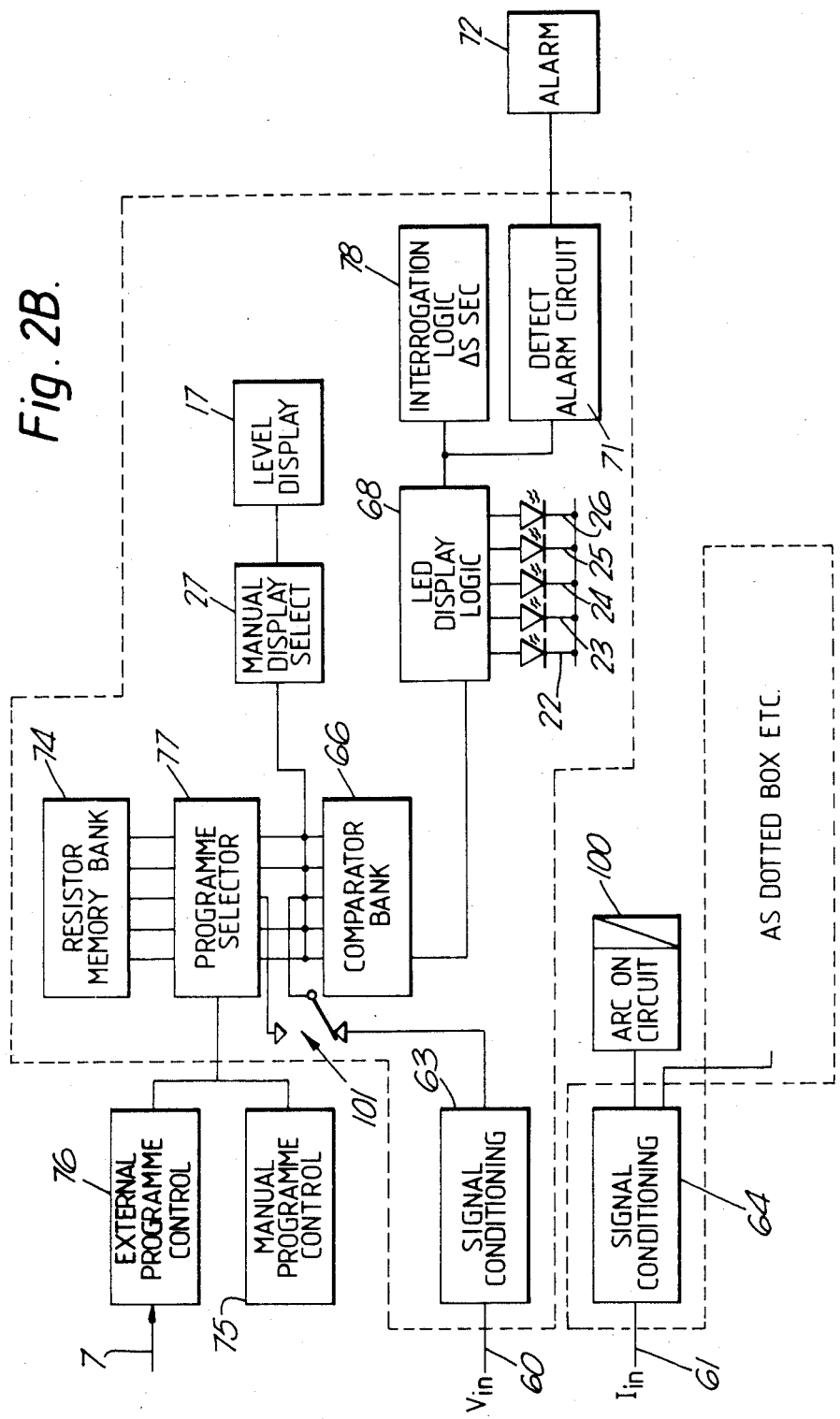

FIG. 2B illustrates a modification of the FIG. 2A example in which in place of the manually operated push button switches 80, 81, an automatic changeover is incorporated so that the programmable error monitor is only active while an arc is operative. FIG. 2B only illustrates in detail the voltage circuit. This is similar to the current circuit etc. An "arc on" circuit 100 detects whether an arc has been struck, by detecting for example when welding current reaches a predetermined value (eg. 50 A) or when some other parameter exceeds by a certain amount a predetermined value. If "arc not on" then the middle or preferred value from the memory store 74 via the programme selector 77 is connected to the comparator banks 66, 67, thus ensuring that no alarms are tripped. When "arc on" is detected a relay changeover switch contact 101 is controlled so that the mean of the or each arc parameter is transferred to the relevant comparator bank for comparison.

The circuit network shown inside the dotted line of FIG. 2B is repeated for other analog signals as required (eg. current), and similarly for the status signals. The units 76, 75, 72 and "arc on" change are common to all input signals.

The monitors of FIGS. 2A and 2B have two modes of operation, a learn, set-up or programming mode and a monitoring mode.

Programming Mode

In this mode, the array 74 of resistors is preset with the upper and lower limits for each parameter and the preferred value for each parameter. Firstly, a signal representing a particular welding programme or welding operation is fed via an external programme control circuit 76 or from a manual selector 75 to the programme selector 77 so that a particular set of resistors is selected. Then for each parameter in turn a preferred value for the parameter is programmed by adjusting the appropriate presettable resistor.

In the FIG. 2A example, to assist this the display selectors 27, 28 are turned to face the central LEDs and the press button 80 or 81 is depressed so that the preset value is displayed by the corresponding level display 17, 16. When the push button is released the display 16, 17 is blank and the signal channel cleared to accept and read for example voltage values for the power source to which the monitor is connected.

In the FIG. 2B example, the "arc on" circuit 100 will detect "arc not on" and the relay 101 will connect the preferred value output of the memory store 74 via the programme selector 77 with the display selector 27.

With the preferred voltage value set, the maximum/minimum tolerance levels are next programmed. In the FIG. 2A case for example, the selector switch 27 may be moved to point towards the "LO" position (FIG. 5) and then the appropriate resistor adjusted while the display 17 is viewed. This then sets the lower limit for the voltage parameter. This is then repeated by moving the selector switch 27 to the "HI" position (FIG. 7) and the upper limit is preset. This example also enables intermediate values to be preset by turning the selector 27 to point towards the LEDs 23, 25 in turn (FIGS. 4, 6) and setting the appropriate resistors.

This sequence is then repeated for current and gas flow (without intermediate values in the latter case). In practice the same gas flow tolerance range may be used for each programme in a set of programmes.

The selectors 27, 28 are then returned to the central position in which they point to the LEDs 24 and with the push buttons 80,81 released the system is set up ready for monitoring as described below. However the preset upper and lower levels may be checked by turning the selector 27 appropriately.

Figure 5:
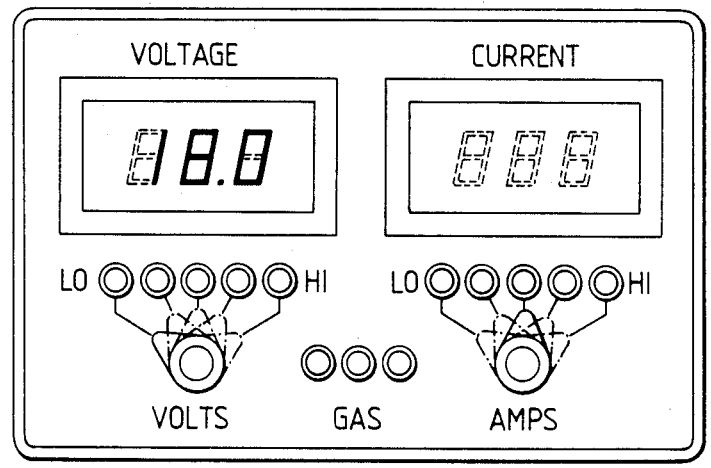
Figure 7:
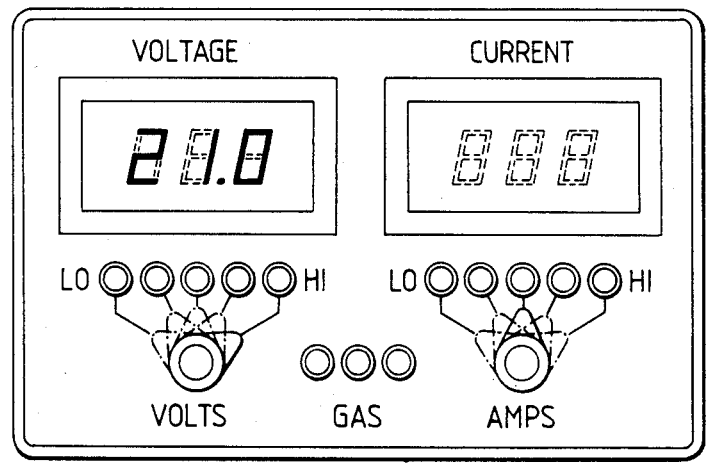

FIGS. 5 and 7 illustrate the selector 27 pointing towards the LEDs 22, 26 respectively and the corresponding lower and upper voltage limits of 18.0 and 21.0 volts as determined by the resistor array 74. In an alternative arrangement (not shown) the preset values may be represented by digital values stored in a memory and converted to voltages by digital to analogue converters.

The actual values to the preset must be determined empirically and in general the upper and lower limits will depend upon the degree of quality assurance required by the user.

FIG. 8 gives details of a typical suite of programmes for use in MIG welding using 1.2 mm dia welding wire and A/5% $CO_2$ shielding gas.

Programmes 1, 2, and 3 are for spray-type (free-flight) metal transfer application with different preferred values of arc voltage and current together with associated tolerance levels.

Programmes 4, 5 and 6 are for dip-transfer (short-circuit) arc applications, again having different preferred and tolerance levels.

Programmes 6, 7, and 8 are for dip-transfer applications where the preferred values of voltage and current do not alter, but the tolerance levels are set for enhancing levels of quality assurance stringency.

Monitoring Mode

After the various limits and preferred values have been set, the monitor 5 is able to operate in its monitoring mode. In this mode, the selectors 27, 28 are positioned centrally so that they point to the LEDs 24, as illustrated in FIG. 3. In the FIG. 2A example, providing the press buttons 80, 81 are released, the operating values for the voltage and current respectively will be displayed in the displays 17, 16. With the FIG. 2B example this will be automatic when weld current is detected by circuit 100 which actuates relay 101. During a welding operation these operating values will fluctuate due to changes in welding conditions and FIG. 3 illustrates the operating value of voltage at some stage during a welding operation. At the start of a welding operation, the welding control device 4 will indicate on the line 7 the programme to be implemented. This signal is passed to the programme select logic 77 which connects the correct sets of preset resistors or their equivalent potentials to the comparator banks 66, 67 and to selectors 27, 28. Signals representing voltage and current will be fed along the lines 8A, 8B to the ports 60, 61 while the signal representing gas flow will be fed along the line 11 to the port 62.

Providing the operating values of voltage and current are sufficiently close to the preferred values, the central LEDs 24 will be illuminated. Typically, the LEDs 24 will be green.

The operating values of the parameters are continually compared in the comparator banks 66, 67, with the preset limits and if an operating value should decrease or increase beyond the lower and upper intermediate limits respectively this will be detected by the appropriate comparator bank and one (in the case of voltage) of the LEDs 23, 25 will be illuminated. Conveniently, these LEDs are amber and this provides a warning indication that an operating value is approaching one of the upper and lower limits.

If a comparator bank 66, 67 detects that an operating value has passed above or below the upper or lower limit respectively then (in the case of voltage) one of the LEDs 22, 26 will be illuminated. Conveniently, these LEDs are red. In addition, the signals from the comparator banks 66, 67 are fed to the detect alarm circuit 71 which causes an audible or visual alarm 72 to be activated once an alarm condition is satisfied as explained below.

Gas flow rate is also monitored and in this case it is considered sufficient to indicate whether the gas flow rate is acceptable or unacceptable without providing additional information as to the actual value of the flow rate. The signal representing gas flow rate is thus fed directly to the logic circuit 70 to cause the LED 30 to be illuminated if the gas flow rate is acceptable or one of the LEDs 29, 31 if the flow rate is unacceptable. Conveniently for flow, optical sensors can be placed in for example a bobbin type flow gauge above and below the desired flow rate so that insufficient or excess flow cause the appropriate LED via the signal conditioning and logic circuits 65 and 70 to be activated, while between these limits the central LED is illuminated. Preferably, the LED 30 is green and the LEDs 29, 31 are red. The logic signal is also passed to the detect alarm circuit 71 which will cause a corresponding alarm to be activated if the gas flow rate becomes unacceptable.

Figure 4:
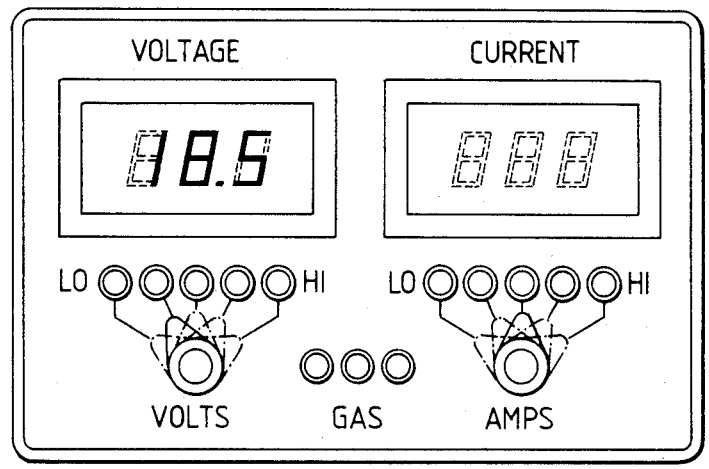
Figure 6:
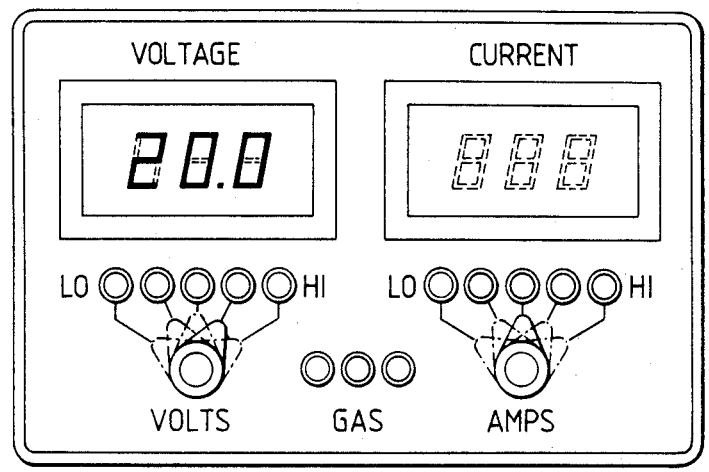

When welding, the operator may wish to review the preferred value for one of the parameters. To do this in the FIG. 2A example, the appropriate selector 27, 28 must be positioned to point towards the LED 24 and then the appropriate press button 80, 81 is depressed. This overides the normal display of the operating value and causes a display of the preferred value. In addition, if the operator wishes to view the tolerance limits, this can be achieved simply by turning the appropriate selector 27, 28 to point towards the appropriate LED. For example, FIGS. 4 and 6 illustrate the display of the intermediate limits for voltage.

When a change in welding programme or welding operation takes place, a new programme control signal is supplied to the circuit 76 which causes the programme select logic 77 to connect different sets of the preset resistors or equivalent potentials to the comparator banks 66, 67. No intervention by the welding operator is required at this changeover.

The monitor is suitable for direct interfacing with a central computer which can for example gather real-time information of preferred levels, tolerance levels and actual parameters from a large number of different welding stations. The monitor 5 provides an "alarm present" output signal from the circuit 73 (FIG. 2A). This is fed to the central computer which if it detects such a signal can then interrogate the appropriate monitor. An interrogation signal is fed to the interrogation logic select circuits 78, 79, 84. The circuits 78, 79, 84 are controlled by the interrogation signal to pass either the real time value of a parameter or one of the stored values to the appropriate conditioning circuit 82, 83, 85 so that this can be examined in greater detail by the central computer. The central computer can then determine whether a major problem has arisen and if necessary alert supervisory or maintenance personnel.

Figure 9:
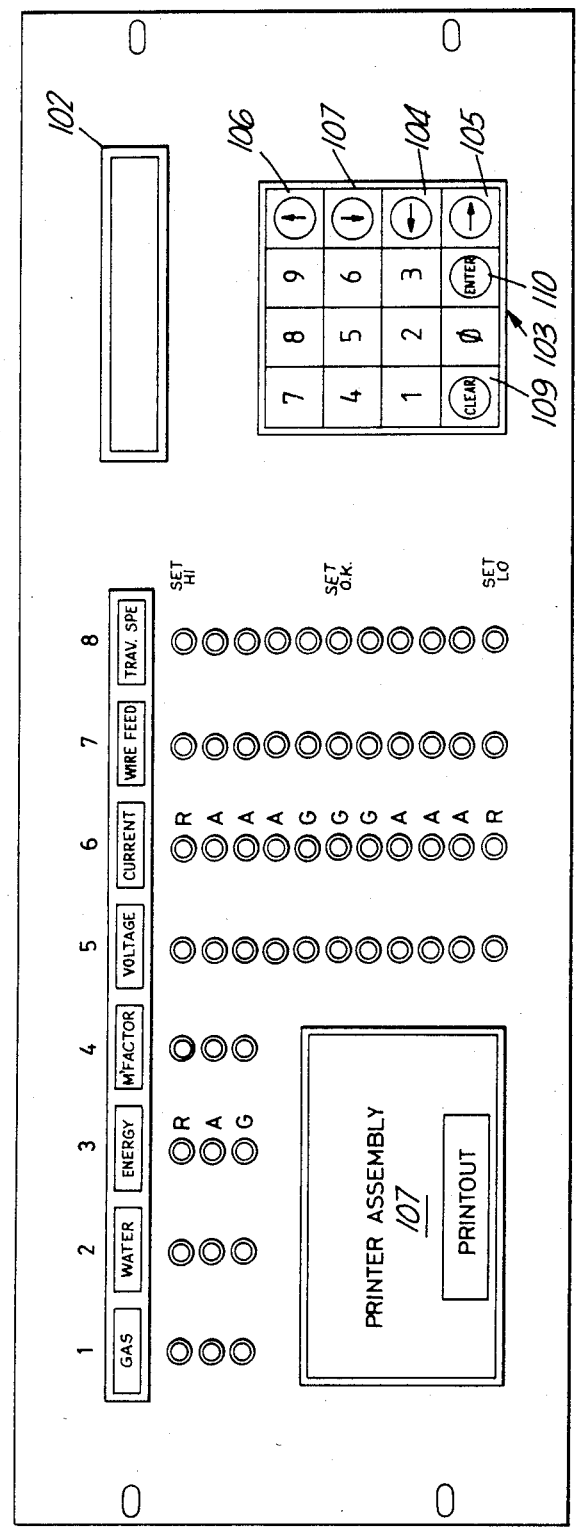
FIG. 9 illustrates the front panel display of a second monitor.

A more extensive monitor is illustrated in FIG. 9 based on the arrangements already elucidated and shown in FIGS. 2A and 2B. This example allows for up to four parameters (travel speed, wire feed speed, current and voltage) with detailed LED deviation subdivided into 10 steps from high to low with LED colours ranging from red (R) through amber (A) to green (G). A further four parameters are included for which it is not expected that the parameter will exceed some natural limit and the main requirement is to indicate its status, such as on or off. An example is water cooling for which an excess is of no significance and in any event there may be a natural limit to the maximum water flow, but any reduction below a desired level or the absence of water flow is unacceptable. Other examples are M factor (as described in EP-A-0119052), energy and gas flow. The deviation displays operate in a manner similar to that already described for display logic 68, 69 with respect to continuous analogue parameters and logic 70 with respect to a status parameter.

The panel also includes a keypad 103 having parameter select buttons 104, 105 and incremental level display buttons 106, 107.

Also instead of a simple digital display of the operating parameter or the appropriate high and low tolerance levels, as for example shown in FIGS. 3-7 inclusive, an alphanumeric display 102 is provided. This indicates for example, as shown in FIG. 10a in more detail, the relevant programme number (eg. P-21) and the high (HI) and low (LO) limits together with the preferred value (OK) for the parameter concerned. When the welding system is in operation the lower half of the display reverts to showing the running value of the parameter (emphasised by asterisks for example) together with the high and low limits and preferred value as before, FIG. 10b. If an extreme limit is reached or exceeded then the appropriate marker asterisks may flash to alert the operator/inspector when interrogating the monitor. The selection of which parameter is displayed in detail in the alphanumeric panel is governed by the horizontal direction control buttons 104, 105 which scan over the whole set of parameters.

The key pad 103 is used to enter the high and low limits which are then automatically subdivided into the five increments on either side of the preferred value. Thus it is not necessary to allocate individual values to each LED in the set of 10 but only the maximum/minimum and centre values. In one convenient arrangement a microprocessor is used to determine the appropriate digital values for the intermediate steps and in the operating mode the running parameter is compared digitally with these levels to activate the appropriate LED. Thus in use with the natural deviations that occur in practice the LED indications are moving up and down with respect to the centre value.

Any major error, that is a deviation equal to the maximum or minimum limit or more, is recorded on a printer 108 together with the time of occurrence. This is used for quality assurance purposes where the existence of major errors in a weldment can be identified from their time of occurrence with respect to the production schedule and other inspection such as non-destructive examination applied to such suspect areas of the weldment. These errors are the short-term excursions up to and beyond the limits where a long-term excursion (or an error from more than one parameter) acts to provide an alarm indication from circuits 71, 72, 73, and so forth. As indicated previously such a monitor can be used as a stand-alone monitor giving suitable front panel indications to the user or it may communicate with a central or host computer, such as being interrogated for error following an alarm.

To enter a specific programme the Clear button 109 is depressed in the key pad 103 following which the programme number is entered. This system can store a large number of programmes such as 99 or even 999 in a PROM (not shown). The appropriate parameter is selected for data entry and the desired maximum value keyed in with the Enter button 110. Similarly the low value and the preferred value are entered. For convenience the alphanumeric display 102 shows the appropriate symbol HI/LO and OK as flashing until a value is entered whereupon the letters are constant. This is repeated for all the parameters concerned. In use all parameters give rise to LED indications but only the selected parameter is shown in detail in the alphanumeric panel and is selected as described above by the horizontal shift keys 104, 105. The horizontal and vertical shift keys 104–107 can also be used to interrogate and display any particular level for the intermediate LEDs after the HI/LO and preferred values have been entered. For convenience when a vertical key is depressed the letters HI/LO and OK are eliminated and the declared level is shown on the lower half in a position intermediate between that normally used for OK (the preferred value) and that for the high or low letters, according to whether it is above or below the preferred value. In the example shown in FIG. 11 the various voltage levels would be one of 18.3, 18.6, 18.9, 19.2 for less than the centre value and equally one of 19.9, 20.3, 20.7, 21.1 for the levels higher than the preferred value. Equally for current the various levels would in this example be one of 145, 147, 149, 151 for less than the preferred value or one of 156, 159, 162, 165 for above the preferred value.

As already described, in use the display panel 102 indicates the running value of the parameter with the associated high/low limits, as illustrated in FIG. 10b, where the parameter has been selected by the horizontal shift keys 104, 105. The vertical shift keys are ignored during the welding operation.

Figure 12:
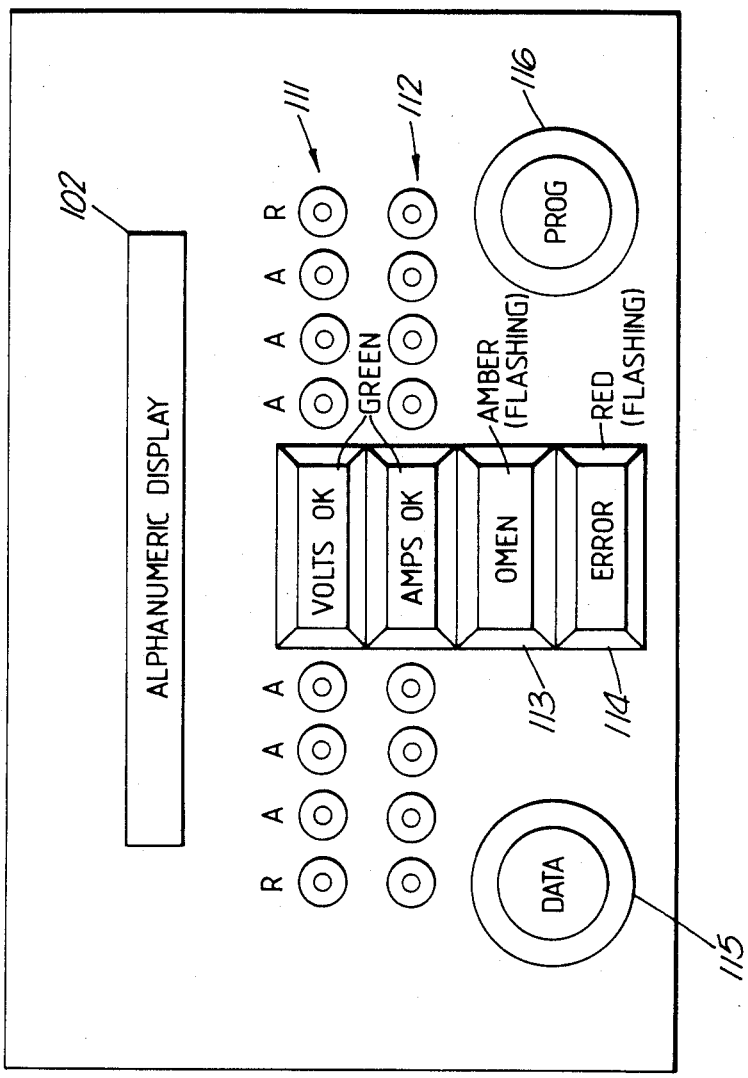
FIG. 12 illustrates the front panel display of a third example of the monitor.

A simplified version of this comprehensive programmable error monitor is shown in FIG. 12. This is intended for use by the operator rather than the supervisor and, for convenience, the supplementary functions, viz data printer and keyboard are eliminated. The necessary data for the high/low limits of the various parameters have of course to be entered as before, and in this case is done remotely via for example a standard computer link such as an RS232 (not shown).

In this simplified unit two LED deviation displays 111, 112 are provided to indicate two major parameters such as voltage and current and for convenience a broader degree of deviation is allocated to the central or preferred value which also has a larger size illuminated display. Thus in the illustration one incremental step on either side of the preferred value may still be shown as acceptable, that is green in the main central display, but that larger deviations then show amber and ultimately red as previously described. For use by the operator the largest excursion is stored throughout the welding operation so that, after welding, inspection of the front panel immediately shows from memory whether or not the welding operation is within the preferred range or deviating significantly. Based on such information the operator may then readjust the welding equipment accordingly and proceed to the making of further welds.

Apart from the two major parameters indicated in detail, the remaining parameters are monitored and the status of the worst one of all declared on the central display if it is not within the preferred range. Thus an amber "Omen" indication 113 is a warning that some other parameter is no longer within the preferred range and similarly a red "Error" indication 114 shows that one of these remaining parameters is at fault. This unit can then be interrogated using a data press button 115 which initiates a search through the parameters and causes the extreme value registered to be shown on the display screen. The preferred value can also be indicated for comparison. The programme of all data can be incremented conveniently by a programme press button 116 where, as indicated earlier, all data has been previously entered into the system. Instead of data entry via a computer link, the data can be in the form of a ROM memory which is inserted in the equipment prior to use, preferably via a zero insertion force (ZIF) socket.

Figure 13:
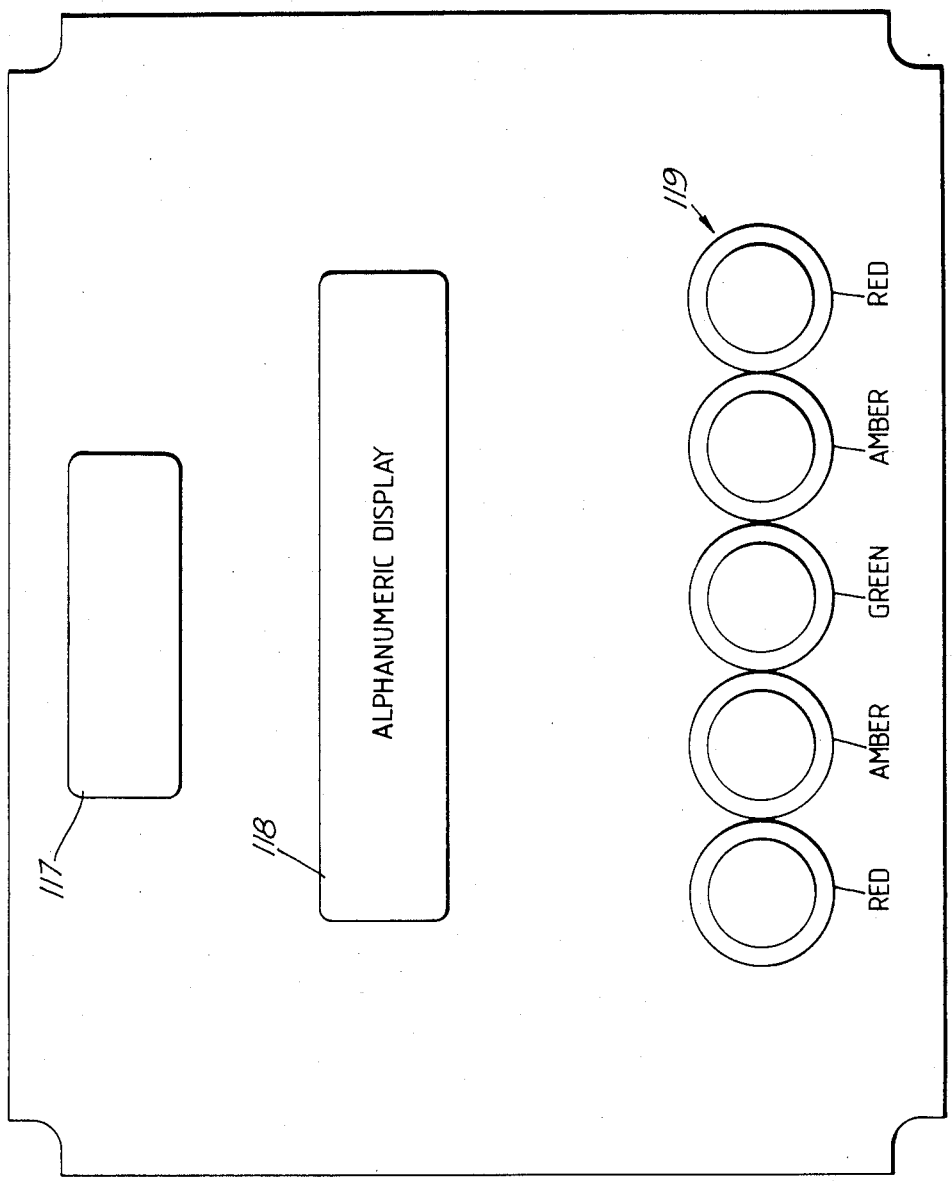
FIG. 13 illustrates the front panel display of a fourth example of the monitor; and, FIG. 14 is a flow diagram of a computer programme for controlling operation of the monitor.

Yet another arrangement is shown in FIG. 13 which is particularly suitable for shopfloor use. Here the data displayed is reduced to a programme identification display 117, an alphanumeric data panel 118, and the status of all parameters is monitored by a set of five coloured indicator lamps 119 which indicate the status of the "worst" parameter. These latter also serve as press switches for encoding the system as described below. Thus the main panel display (programme and status) is readily observed at a distance, while more detailed information can be derived from the alphanumeric display on closer inspection, as required. For convenience the deviation graduation from preferred to limiting values, green and red respectively, are subdivided into four steps, viz green/amber, amber alone, amber/red, and red, for both high and low deviations about the optimum. The illuminated alphanumeric display 118 operates on a selected parameter which is determined by appropriate push button selection prior to welding.

In an alternative arrangement shown for example for current in FIG. 10c, the high/low limits are displayed as before, but the preferred value (indicated by OK) which is displayed here on the lower half of the display reverts to the running value of the parameter as illustrated in FIG. 10d, together with an index of the degree of deviation from the preferred value. This avoids having to make a mental estimate as the deviation is clearly indicated in analogue fashion by the position of the asterisk between the high/low limits in the upper half of the display. For convenience each step of the deviation asterisk corresponds to the step change in the indicator lamps, viz RA, A, AG, GA, A, AR between the extreme limits. Moreover if the deviation reaches or exceeds a high/low limit the corresponding annotation HI/LO may flash. In addition the status of all the remaining parameters is also declared on the coloured indication lamps in a visually distinctive mode. For example the status of the selected parameter can be shown by a steady light and the status of the worst of the remaining parameters by a flashing light. In the event of the status of both the selected parameter and the worst of the remainder being the same, then yet a different flashing frequency can be utilised.

Apart from the external programming via a computer link such as an RS232, inserting a suitable ROM data bank or by plugging in a dedicated key pad for data entry, these units can be used in a self-learning mode, indicated by L in the programme number displlay. Here, by appropriate function switch selection, the Programmable Error Monitor reverts to a read only mode where welding parameters are registered for a finite period, such as over say 10 seconds. This data is continuously updated until a final welding condition is deemed satisfactory. The appropriate average of the last 10 seconds of data are then entered into memory by key switch function, whereupon the programme indicator changes from L=learn to P=Programmable Error Monitor at the corresponding programme number. The deviation limits may be automatically set at ±5% for this purpose for the parameters deemed sensitive, and say ±20% for those deemed less important. Alternatively the excursion limits of each parameter can be entered onto the self-learnt data using the key switches to enter the degree of deviation, either as a percentage of the preferred self-learnt value or as a finite numerical deviation above and below this value. When all the self-learnt parameter data has been entered together with the deviation limits, the error monitor is ready to function as previously described.

A further function is available for equipment set up which is again selected by appropriate key function and indicated by E in the programme number display. Here the preferred values are given upper and lower limits of ±2% for the sensitive parameters and ±5% for the less sensitive parameters automatically. In this mode the monitor does not declare an alarm, but the indicator lights operate as before, showing clearly whether the selected parameter is above or below the preferred value. In use the welding equipment is adjusted until green is declared on the selected parameter, and so forth for all the parameters concerned. Under these conditions the equipment is set up accurately to home on the preferred value since the visual display of deviation is at a high sensitivity. In use as an error monitor but with the appropriate greater tolerances, then the natural deviations during a welding operation are expected to lead to excursions less than the alarm. For convenience short term excursions, such as of one second duration or less, into the limiting alarm extremes may be counted as acceptable but longer term deviations, such as exceeding 5 seconds, may activate the alarm or terminate the welding operation as appropriate.

In use the deviations are registered and held in memory for subsequent examination in a playback mode. For interrogation the worst deviations high or low are shown first, viz short term red excursions and then lesser deviations such as amber/red and amber. For this purpose it is not necessary to show the green and amber/green deviations as these are considered in normal terms to be insignificant. For convenience, in the alphanumeric display the total number of deviations of each class is shown and on interrogation these are registered in turn together with their time of occurrence. This data is available for further manipulation as desired, for example a running error index can be declared, where the degree of deviation suitably weighted is summed per event over a time period such as 10 seconds. A long term error index can also be shown as the error count per 100 seconds and so forth. This enables the operator to be aware of a general increase in the degree of deviation or error well before extreme conditions leading to an alarm occur.

The functions discussed above in connection with any of the units can be achieved with hardware or software based equipment. A software system will be described in detail but it will be evident to a skilled person how to construct an equivalent hardware system.

Figure 14:
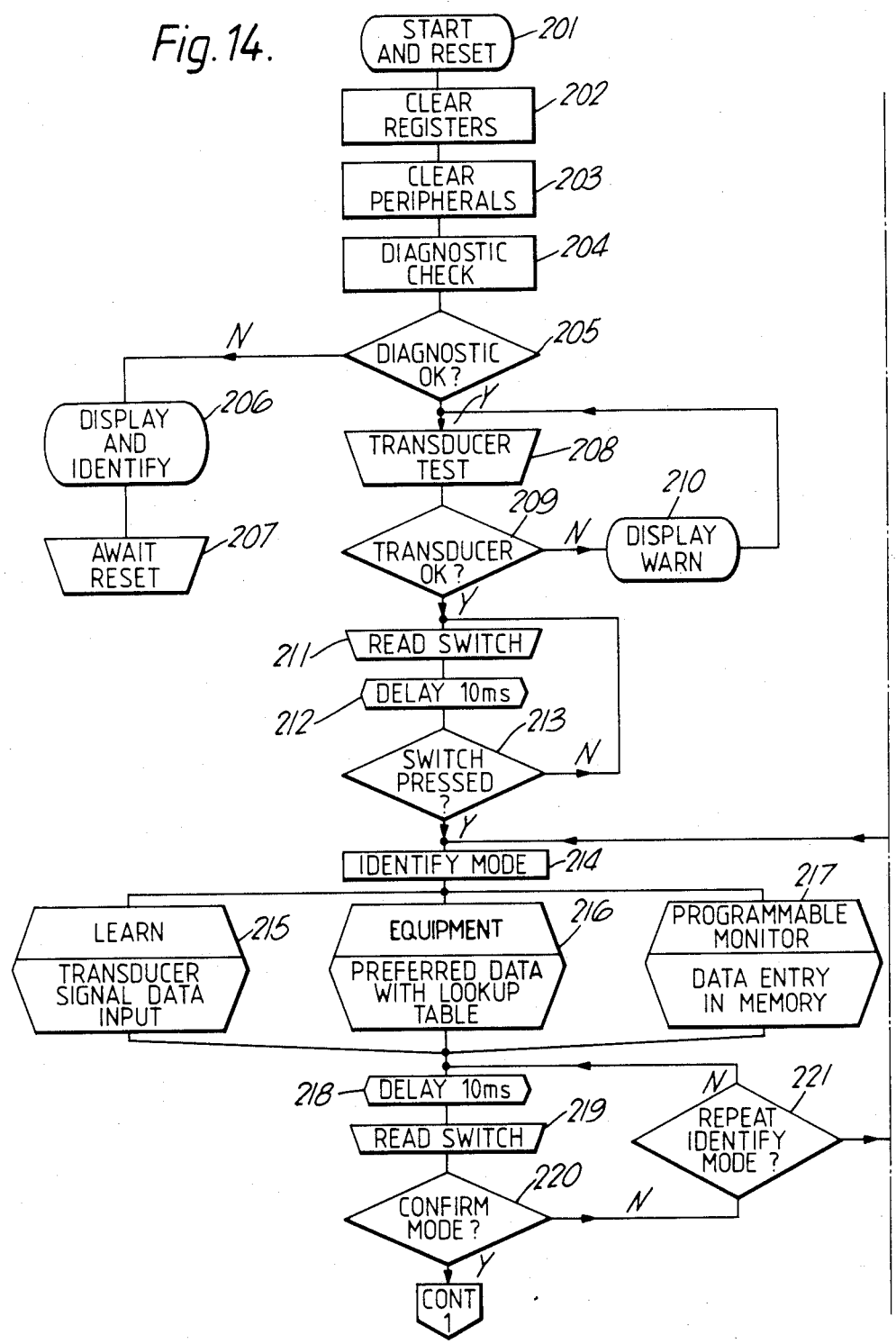
Figure 14:
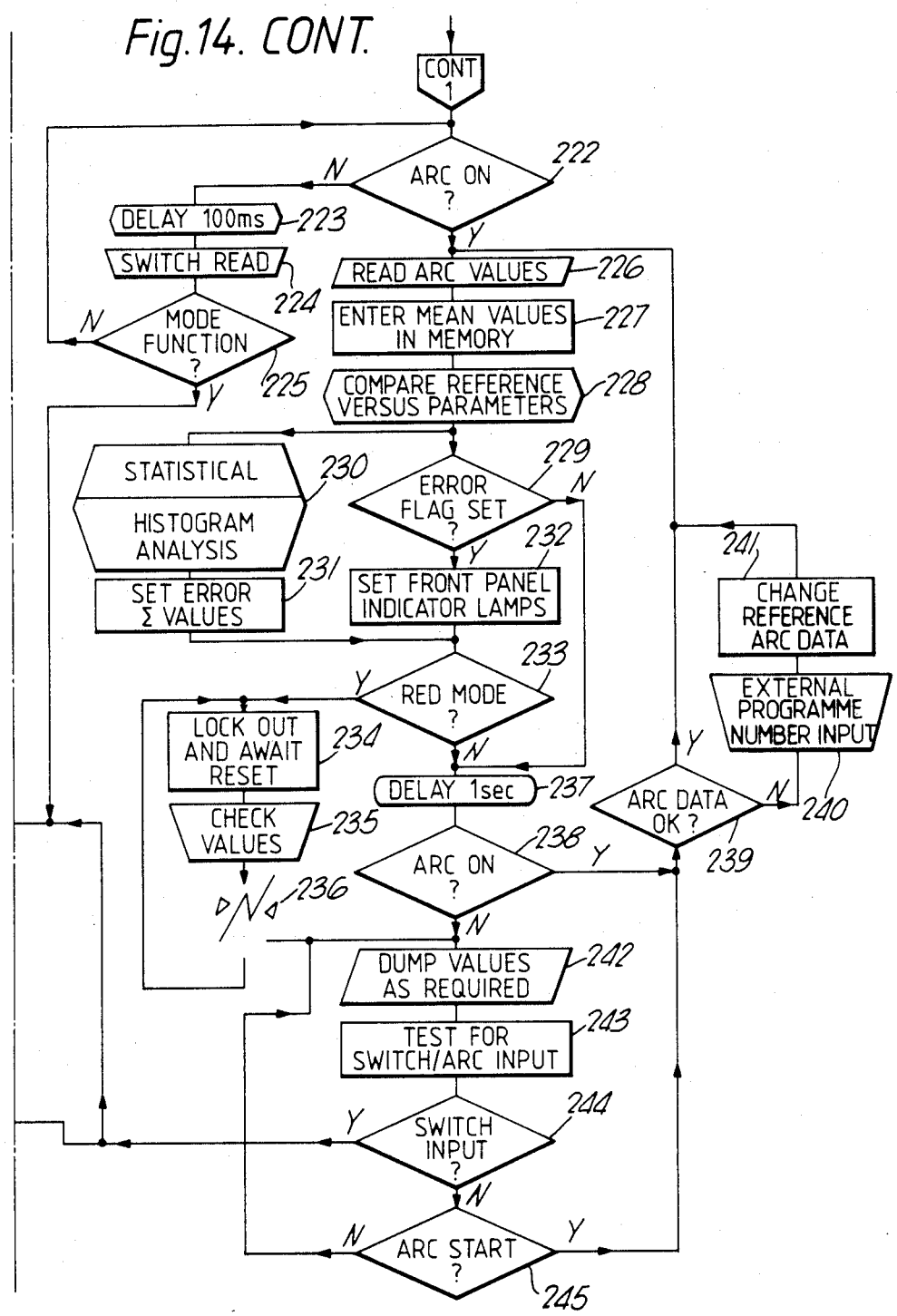

The flow diagram of the corresponding software is shown in FIG. 14.

When electrical power is first supplied to the microprocessor system (eg. ±15V and ±5V), the microprocessor recognises this, goes into an internal housekeeping mode and resets all its registers to a known state 201.

The next stage is to clear all other registers to a known value 202 and also clear the peripheral registers 203. Peripheral registers are those contained in latches, displays, real time clock, keyboard buffers, printer buffers, analogue to digital converters etc. The system is now ready to embark on a self-diagnostic check 204. The latter involves writing and reading a pattern to selected registers, comparing with a set memory location and executing a check sum on the programme stored in ROM. Should there be an inability to achieve any of the said functions, the microprocessor can preferably identify the offending item and display a given message, e.g., [A-D FAULTY***] 206. The system will then go into an endless loop 207 so that it cannot achieve a further task, and thus awaits a reset command, e.g. power up, providing that the faulty device has been rectified.

On completion of the diagnostic check 205 and no errors having been found, the microprocessor then proceeds to test the transducers 208.

This is achieved by means of the "intelligent" mode adopted in their constructions. Not only do the transducers provide a normalised output signal such as 0–10V (which may also be conveniently expressed as a serial digital number, ie. for interconnection RS232/RS423 etc or other functions); they also provide identifications of the scaling factor, reference data and internal power supply status.

If the microprocessor has in the check mode 209 read the incoming transducer data and finds an error, e.g. the supply to the transducer No. 5 say is down, it warns the user via the display 110, i.e. "WFS TD SUPPLY FAULTY" where code 5 from the transducer signifies it is a wire feed speed transducer.

After a fault has been detected, the system continually goes through the test routine outlined 208, 208, 210 until the fault has been cleared.

The transducer check system is designed to take advantage of this facility so that faults may be cleared in situ or transducers replaced without switching off power. Once the offending tranducer has been made to function, the microprocessor will automatically proceed to its next task 211.

On completion of all check tests, the microprocessor then awaits to see if any switches have been pressed 211. The switches instruct the system what tasks are to be performed. To overcome or avoid switch bounce the microprocessor is provided with a delay routine 212 of say 10 ms and confirms that the switch is still pressed 213 before proceeding to the next stage. Should the switch not be pressed, then the microprocessor goes into a loop testing for switch press 211, 212, 213. In this manner, erronous switch data is not entered.

Having established a switch has been pressed, the microprocessor identifies which task it is to perform 214 by noting which code the switch represents and then proceeding into one of three subroutine modes 215, 216, 217.

These three modes are
(i) Learn mode:
  transducer signal data is assimilated as reference data for future comparison in monitor mode 215
(ii) Equipment set up mode:
  Reference data is derived from a preset look-up table based on pre-programmed preferred values 216
(iii) Programmable Error Monitor mode:
  Reference data is held in memory from assigned external devices, eg. keyboard, RS232 link, from self-learn operation or from an inserted specific memory ROM 217

(i) Learn mode subroutine 215

In the learn mode subroutine the microprocessor reads the average of each available transducer signal and places this value in a specific memory location. For any one welding procedure this would be stored as programme L-01 say. This may be repeated for up to 20 programmes. The user will at the end of the trial procedure store all the self-learnt preferred values, in the main programme area for pseudo permanent storage. This memory area is defined to be recalled with P-01 to P-20 in place of L-01 to L-20.

(ii) Equipment setup mode subroutine 216

In this mode, shown as E with the programme serial number, the subroutine utilises the preferred values stored in ROM. The values stored will be the preferred values of all relevant data but with relatively narrow tolerances, such as ±2% for critical and ±5% for less sensitive parameters. Up to 99 programmes may be stored in this manner. Any unused memory locations may be programmed with zeros (∅∅) to signify there are no further programmes past say P-15 or E-15.

(iii) Programmable Error Monitor subroutine 217

Data may be entered in situ via a serial link (RS232 etc) or via a keyboard if provided, or transferred from a self-learn mode as indicated above. This mode provides for data entry to a reserved memory which may itself be a non-volatile type, viz battery backup-RAM, EEPROM. The user, having selected the Programmable Error Monitor mode, will then be asked for the programme number, the validity of data and whether a printout of stored data is required, e.g.

---

P No ? . . . [5]         [5] signifies user entry

| -continued | |
|---|---|
| P 5 V 20.2 ? ... [18.5] | 20.2 signifies data already in programme 5 |
| P 5 V 18.5 | shows user has entered new value 18.5 into P 5 for voltage |

At the end of data entry, the user is presented with an option for printing out the complete list of data. These new values are then used as references for evaluation of the welding process.

On selection of the mode required for the monitor, the microprocessor enters a 10 ms delay 218, and reads the switches again for confirmation 219. If no confirmation of the switch condition is sensed 220, the microprocessor goes into a loop 221 to the delay routine 218 and hence awaits confirmation. This approach has the advantage that the user may correct an error in MODE selection. Should the confirmation be abrogated, the repeat mode is entered 221 causing the microprocessor to enter the identify mode at 214 and the routine is repeated from 214 onwards as outlined. This enables the user to select another mode as desired.

Having selected the confirm mode 220, ie. the mode as selected is wanted, the system then waits for the arc to be struck 222. This may be sensed by a hardware component consisting of a comparator which is set to give an output when say more than 50A is occurring. This sensor may of course be set for any other parameter or combination of parameters, e.g. voltage plus current to signify that the arc is established. The comparator output is fed to a peripheral port which registers a digital "1" or "0", where "1" indicates that the arc is on.

If no arc has been struck, i.e. the peripheral port reads "0", a delay 223 of 100 ms is entered into, then the switch press 224 read mode is tested 225. Should a selector or function switch be pressed, the microprocessor reverts to the identify mode again 214. This loop enables the user to change a programme mode.

Should no switch be pressed, the software routine tests for arc "on" again 222.

If the arc "on" level is detected, ie. "1" at the peripheral port, then the arc parameters are read 226 via analog/digital converters and the mean values entered into memory for further comparison 227.

Apart from self-learning mode being selected, the operating arc values and their derived parameters such as power, M factor etc, are then compared with the stored reference values 228 from a selected programme, e.g. p-26.

If any comparison is outside the allocated error band determined by the preset limits, an error flag is set 229, which is internal to the microprocessor.

At the same time as the degree of error in the parameter is determined, it is placed in a statistical subroutine, which is used to provide a histogram of errors if needed 230 and allocate weighted error values for summation for further processing 231. The output of this subroutine may be used to set a major error mode, i.e. RED condition 233, as well as the output from the error flag via the front panel indicator lamps 232.

If a RED out of limit mode 233 has been entered for a sufficient period (eg. 5 or 10 seconds), then the lockout mode is entered 234 whereby the microprocessor indicates that the tolerance limit has been reached. The microprocessor goes into a check value routine 235 and dumps or prints out the operating and reference data via a RS232 or similar link 236. Once that has occurred the system awaits reset by looping. Any further events from the arc are ignored until a reset is declared.

If the error flag has not been activated 229 then the microprocessor bypasses the error detecting mode 230, 231, 232, 233, and enters a one second delay mode 237, tests for arc still on 238 and, if it is, checks that the existing programme is still required 239. The programme could require changing during the course of welding as the local conditions change. Therefore new programme values are required, e.g. from P-18 say to P-36, P-41, P-14, etc. This change will be determined by an external code signal 240 and carried out by the microprocessor according to the required programme numbers. Alternatively a known sequence of programmes may be arranged in a stack, and simply incremented from one to the next. The required reference values 241 then are loaded into the microprocessor memory from those stored for all programmes, and the microprocessor continues to read the arc values 226 while the arc is running.

Conversely, if no programme changes are required 239, the microprocessor looks for arc still on, reading the arc values 226, and proceeding as before.

Should the arc after the several comparisons be not on 238, the system checks to determine whether the values obtained should be dumped and/or displayed on the front panel (as required) 242. Such displays are illustrated in FIG. 10/11. After the data has been displayed as required the microprocessor tests to determine whether the arc has been struck again (new weld) or whether a switch has been pressed 243.

If a switch has been pressed the microprocessor returns to the identify mode 214 and continues as previously described. During an arc on situation, provided no function switch has been pressed (switch selection is considered as having priority over arc start), the microprocessor then checks whether the arc is still on 245, checks for the correct programme via the programme number code 239, and proceeds as before to 226. If no arc start has been detected 245 the microprocessor returns to see whether any data requires to be dumped or displayed 242 and then loops via 243, 244, 245, until a function switch change or arc start has been detected.

This last loop is considered to be the most common state of the system after power up, as it is envisaged that in normal repetitive operation the programme number remains unchanged.

Instead of a simple go/no go alarm system, ie. an alarm condition is determined when a RED level is crossed for a finite period such as 5 or 10 seconds, a weighted error assessment may also activate the alarm. Thus the degree of deviation, independent of actual magnitude, could be weighted linearly as 4 units for Red, 3 for Amber/Red, 2 for Amber, 1 for Amber/Green and zero for Green, irrespective of whether it is a high or low deviation.

Hence a typical weld may result in the following, (each event being based on a one second average):

| 5 Reds | viz | 5 × 4 = | 20 |
|---|---|---|---|
| 8 Red/Amber | viz | 8 × 3 = | 24 |
| 24 Amber | viz | 24 × 2 = | 48 |
| 43 Green/Amber | viz | 43 × 1 = | 43 |
| 200 Green | viz | 200 × 0 = | 0 |
| ΣT = 280 secs total | | ΣN = | 135 weighted error total |

Hence weighted running average error is $$\Sigma N/\Sigma T = 135/280 = 0.482$$

This value may be compared with a maximum acceptance level of say 0.40, hence an alarm is tripped. Other types of statistical analysis may be used, such as non-linear or power law weighting. For example the weighting for each degree of deviation from the preferred value may be as follows: Green/Amber 1, Amber 2, Amber/Red 4 and Red 8. In the above example this gives a running error of 163 in 280 seconds or an average of 0.582. For a square law weighting (Green/Amber 1, Amber 4, Amber/Red 9 and Red 16) this would amount to an error of 291 in 280 seconds or an average of 1.04. For such non-linear weighting a higher acceptance level such as 0.80 could be set.

I claim:

1. A welding monitor for connection to welding parameter sensing means, the monitor comprising storage means for storing at least two sets of predetermined acceptable ranges for one or more welding parameters; comparison means adapted to compare an operating value of said the or each parameter, determined by said sensing means, with said corresponding at least one range; and display means for displaying information relating to said stored ranges and operating values and responsive to said comparison means to indicate the relationship between an operating value of at least one of said parameters and said corresponding predetermined range wherein said storage means stores two sets of ranges for at least one of said parameters.

2. A welding monitor for connection to welding parameter sensing means, the monitor comprising storage means for storing at least two sets of predetermined acceptable ranges for one or more welding parameters; comparison means adapted to compare an operating value of said the or each parameter, determined by said sensing means, with said corresponding at least one range; and display means for displaying information relating to said stored ranges and operating values and responsive to said comparison means to indicate the relation ship between an operating value of at least one of said parameters and said corresponding predetermined range further comprising selector means responsive to a welding programme selected in use to apply a corresponding set of ranges from said storage means to said comparison means.

3. A monitor according to claim 2, wherein for at least one of said parameters, said storage means is adapted to store a single range.

4. A monitor according to claim 2, further comprising a condition selector actuable to pass to said display means an operating value of a parameter when said monitor is in an operating mode or a stored value when said monitor is in a learn mode.

5. A monitor according to claim 4, further comprising calculation means operable in said learn mode to calculate the limits of said ranges of each parameter in response to at least the input of a preferred value for said parameter.

6. A monitor according to claim 4, wherein said condition selector comprises a welding detector which determines whether said monitor should be in said operating mode or said learn mode in accordance with whether or not a welding operation is detected.

7. A monitor according to claim 4, wherein said welding detector is adapted to monitor arc current whereby when said monitored arc current exceeds a predetermined threshold, a welding operation is detected.

8. A monitor according to claim 2, wherein said display means includes at least one array of differently coloured display units which are successively illuminated as said operating value of a parameter varies relatively to said corresponding predetermined range.

9. A monitor according to claim 2, wherein said display means includes at least one of a numeric display and an alpha numeric display for indicating one or more of the operating value of said at least one parameter, a preferred value of a parameter, and the limits of said range of a parameter.

10. A monitor according to claim 9 wherein said display means comprises a common numeric and/or alpha numeric display, and a selector to enable one or more of preferred values, limits of ranges and operating values of a selected parameter to be displayed.

11. A monitor according to claim 2, wherein said display means includes an alarm condition detector connected to said comparison means to determine when a parameter is unacceptable and to generate an alarm signal.

12. A monitor according to claim 11, wherein said alarm condition detector is adapted to determine that a parameter is unacceptable when said parameter lies outside said corresponding predetermined range for a continuous predetermined duration.

13. A monitor according to claim 11, wherein said alarm condition detector is adapted to monitor the operating values of said parameters at regular intervals and, at each interval, to increment a running total by an amount corresponding to the position of the operating value relatively to said corresponding predetermined range to generate a weighted error total and to generate an alarm signal when said weighted error total exceeds a predetermined value.

14. A monitor according to claim 2, further comprising interrogation means to enable signals relating to operating values of parameters and/or alarm conditions to be passed to a remote monitoring device.

15. A weld monitoring system comprising a plurality of monitors according to claim 14; and a common control unit connected to said interrogation means of each monitor, said control unit being adapted to detect via said corresponding interrogation means the operating values of parameters and/or alarm conditions sensed by each monitor.

16. A method of monitoring a welding operation, the method comprising monitoring at least one welding parameter; comparing said monitored parameter with at least two predetermined ranges; and displaying the relationship between said monitored parameter and ranges.

17. A method according to claim 16, further comprising sensing when a parameter lies outside a corresponding predetermined range for a predetermined duration and generating an alarm signal.

18. A method according to claim 16, further comprising displaying the relative difference between an operating value of a parameter and the preferred value of that parameter.

19. A method according to claim 16, further comprising recording at regular intervals the occasions when the operating value of the parameter lies outside said corresponding range.

20. A method according to claim 16, further comprising a preliminary step of loading a memory with data defining all said relevant ranges for each parameter.

21. A method according to claim 20, wherein said preliminary step comprises calculating from preferred values the limits of said corresponding ranges.

22. A method according to claim 21, wherein said limits of said ranges are calculated as ±x% of each preferred value.

23. A method according to claim 21, wherein preferred values are determined by monitoring an acceptable welding operation and determining the average values of the parameters occuring over a predetermined period.

24. A method according to claim 20, wherein said preliminary step comprises calculating from predetermined outer limits, the limits of said ranges.

25. A method according to claim 16, for monitoring a welding system controlled by a number of different welding programmes, said method comprising determining the programme being operated; and selecting the appropriate ranges corresponding to said sensed programme.

26. A method of monitoring a welding operation, the method comprising monitoring at least two welding parameters; comparing said monitored parameters with respective, predetermined ranges; and displaying the relationship between said monitored parameters and said respective ranges further comprising a preliminary step of loading a memory with data defining all said relevant ranges for each parameter wherein said preliminary step comprises calculating from preferred values the limits of said corresponding ranges.

27. A method according to claim 26, wherein said limits of said ranges are calculated as ±x% of each preferred value.

28. A method according to claim 26, wherein said preferred values are determined by monitoring an acceptable welding operation and determining the average values of the parameters occuring over a predetermined period.

29. A method according to claim 26, wherein said preliminary step comprises calculating from predetermined outer limits, the limits of said ranges.

30. A method for monitoring a welding system which can be controlled by a number of different welding programmes, said method comprising determining the programme being operated; selecting the appropriate ranges corresponding to said sensed programme monitoring at least two welding parameters; comparing said monitored parameters with respective, predetermined ranges; and displaying the relationship between said monitored parameters and said respective ranges.

* * * * *